United States Patent

[11] 3,589,206

[72] Inventor Leroy J. Herbon
  South Lyon, Mich.
[21] Appl. No. 13,394
[22] Filed Feb. 24, 1970
[45] Patented June 29, 1971
[73] Assignee American Motors Corporation
  Kenosha, Wis.

[54] SINGLE KNOB CONTROL DEVICE
  5 Claims, 6 Drawing Figs.
[52] U.S. Cl. .................................................. 74/471,
  98/2 E
[51] Int. Cl. .................................................. G05g 9/00

[50] Field of Search .................................................. 74;471
  98/2 D, 2 E, 2 F

[56] References Cited
  UNITED STATES PATENTS
  3,355,960 12/1967 Bureck et al. .................. 74/471

Primary Examiner—Milton Kaufman
Attorney—Barbee and Latta

ABSTRACT: A single knob control device constructed to provide selective, graduated, control of the air dampers of an automotive air conditioning system by use of a slotted mounting arrangement and a plurality of pivotally connected, actuating members.

AIR OFF        HEAT        DEF.

PATENTED JUN29 1971

Inventor,
LEROY J. HERBON
By Barbee & Latta
Attorneys

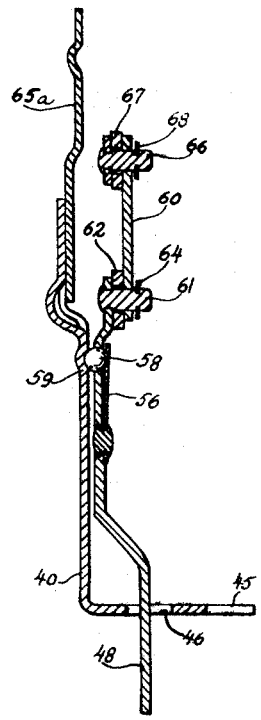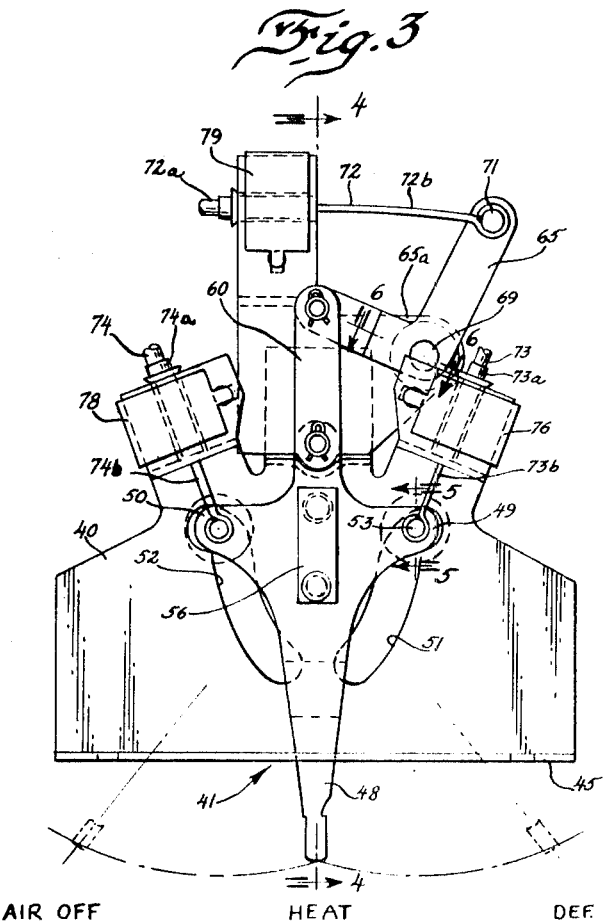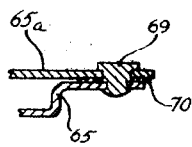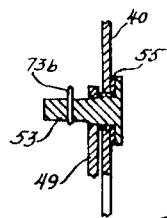
Inventor,
LEROY J. HERBON
By Barber & Latta
Attorneys

SINGLE KNOB CONTROL DEVICE

BACKGROUND OF THE INVENTION

1. Field of the Invention

This invention pertains to control devices for automotive air conditioning systems.

2. Description of the Prior Art

The conventional single knob control device may be of a purely mechanical nature. It may provide the proper positioning of the air dampers and the water valve (or blending damper) for heating and the thermostat for cooling by being rotatable, and movable laterally and axially. Frequently gears are required to move the bowden cables which are utilized to transfer the movement from the device to the system components. Although the single knob device described above is advantageous from a "packaging standpoint" and also relatively economical compared to the automatic-type control, nevertheless the multiplicity of movements of the knob causes confusion to the vehicle operator.

SUMMARY OF THE INVENTION

Applicant has designed a single knob control device that is characterized by its extreme simplicity of operation and economy of manufacture. Further, the space required and mounting arrangements simplify the location of same in the vehicle instrument panel. Specifically, applicant has constructed a single knob control device to actuate only the air dampers of the system by movement to and fro in a single plane. It is to be noted that a conventional air conditioning system requires at least three air dampers due to the combining of the cooling and heating functions into a single system. For example, the evaporator core for cooling is located in an evaporator housing which also serves as a distribution means for heated air. The defrost duct is also associated with the evaporator housing and is located in the upper portion thereof. As a consequence a separate air damper is needed to control the air flow through the defrost duct and another damper is needed in the bottom of the evaporator housing to control the flow of heated air to the lower part of the passenger compartment. Cooled air is generally taken from the evaporator housing through an opening between the defrost and heater dampers which aligns with closeable openings in the instrument panel to provide "spot cooling" to the upper portion of the vehicle operator's body. The evaporator housing also has to be connected with the heater housing which houses the single blower for the system. The heater housing contains the heater core and requires a combination fresh air and recirculation damper to substantially cut off fresh air coming into the housing from the vehicle cowl area during cooling. The damper is normally open for heater operation.

To control the three air dampers of the system, applicant has designed a single knob control device which has a pair of ears slidably mounted on a slotted support. One ear is connected via a bowden cable assembly to the defrost damper and the other ear to the combination fresh air and recirculation damper. Due to the slotted construction, selective and graduated control of the dampers is possible. Also a part of the single knob control device is an interconnected link and crank. The crank is connected via a bowden cable assembly to the heating damper. When the single knob control device is in the central position, the defrost damper is closed as is the recirculation damper (which allows fresh air into the system) and the heater damper is also open. Thus the dampers are properly positioned for heating the vehicle. Moving the knob to the defrost position opens the defrost damper while closing the heater damper. Of course positioning the knob between the heat and defrost position produces a blend of heating and defrosting. Moving the knob in the other direction from the central position closes the heating damper and opens the recirculating air damper for cooling. A midposition position will allow cooled partially fresh air to leave the evaporator housing via the partially open heater damper. If desired, via a suitable overlap the recirculation damper could be partially open to allow fresh air in with the heater damper fully closed.

Applicant also has provided a separate lever located above the single knob device to control the graduated opening and closing of the water valve for heater operation. A water valve, which can be shut off, is preferred to a blending damper due to the high level ventilation provided by the system. Also adjacent the knob and lever is a thermostat for actuation and graduated control of the refrigeration unit and a multispeed blower switch.

While conceivably various designs could be developed to perform all the functions of applicant's control device, it is felt that applicant has provided a unique device that simplifies the problem of multiplicity of levers in a particularly clear cut and economical fashion.

It is, therefore, an object of this invention to provide a new and improved single knob control device for a vehicle.

Another object of this invention is to provide a single knob control device that positions three air dampers of a vehicle air conditioning system by to and fro movement in a single plane.

BRIEF DESCRIPTION OF THE DRAWINGS

FIG. 3 is an enlarged plan view of the single knob control device of this invention;

FIG. 4 is a section taken along line 4–4 of FIG. 3;

FIG. 5 is a section taken along line 5–5 of FIG. 3; and

FIG. 6 is a section taken along line 6–6 of FIG. 3.

DESCRIPTION OF THE PREFERRED EMBODIMENT

Figure 1:
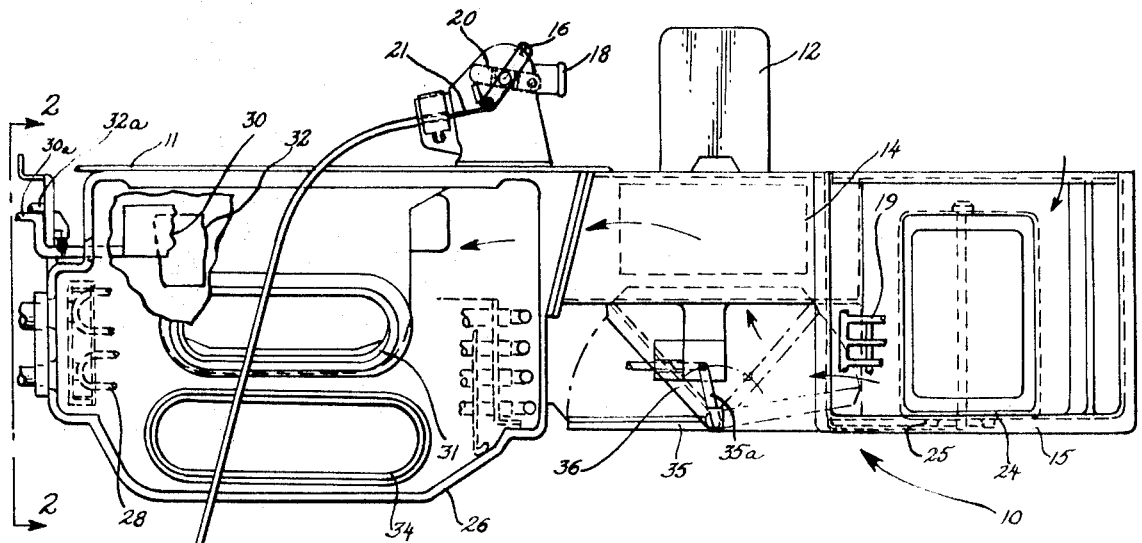
FIG. 1 is a plan view of an automotive air conditioning system that incorporates the single knob control device of this invention with the system details only shown schematically as they do not form a part of this invention.
Figure 1:
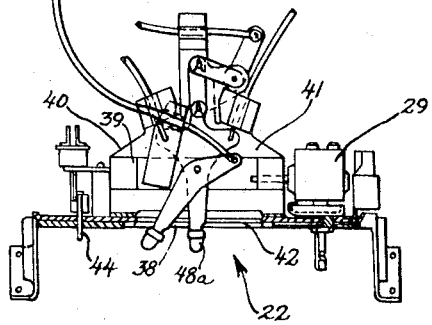

Referring to FIG. 1, 10 indicates an air conditioning system for an automotive-type vehicle 11. System 10 includes a blower 12 that may be mounted in the engine area of vehicle 11. The fan portion 14 of blower 12 extends into heater housing 15 that is mounted in the passenger area of vehicle 11. A water valve 16 is mounted on the vehicle 11 in the engine compartment and has an inlet (not shown) adapted to be connected to the vehicle engine and an outlet 18 to the heater core 19. Valve 16 controls the flow of engine coolant to the heater core which is located in heater housing 15. Valve 16 also has an arm 20 which is connected by bowden cable assembly 21 to the system control arrangement 22. It is to be noted that a water valve is preferred over a "blending damper" due to the desirability of turning off the engine coolant flow when the AC system is used for ventilation alone. A dump-type damper 24 located in the bottom of housing 15 may also be provided for vehicle ventilation when the water valve 16 is turned off. Damper 24 has a suitable handle 25 that is adjustable between various detents by the vehicle occupant.

Evaporator housing 26 is also mounted in the passenger area of vehicle 11 and is joined to heater housing 15 to provide air flow therebetween. Evaporator core 28 is located in housing 26. A conventional thermostat 29 located on control arrangement 22 regulates the operation of the refrigeration portion of system 10. The details of the refrigeration system are not shown as they are conventional and form no part of this invention. The air flow from the vehicle upper cowl (not shown) through the system is in the direction of the arrows.

Figure 2:
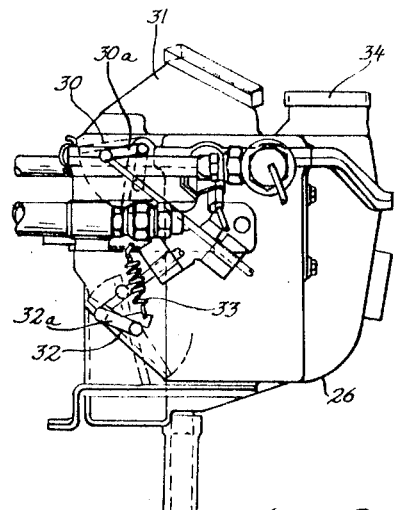
FIG. 2 us a side view of the evaporator housing of the system taken along line 2–2 of FIG. 1.

The air dampers of system 10 are best shown in FIGS. 1 and 2. Defrost damper 30 (having crank 30a) is located in the upper portion of evaporator housing 26 and controls the flow of air through defrost duct 31. Heater damper 32 (having crank 32a) is located in the bottom of evaporator housing 26. The solid line positions of the damper cranks indicate the closed positions of the defrost and heater dampers while the open positions are indicated by broken lines. Spring 33 urges heater damper 32 to the closed position. A torsion spring (not shown) also urges defrost damper 30 to a closed position. Duct 34 is connected to a manifold in the instrument panel (not shown) for the distribution of cooled air.

The remaining air damper of the air conditioning system is the fresh air and recirculation damper 35 located in the heater housing. Damper 35 (having crank 35a) is shown in the full, recirculation position with the fresh air flow that normally moves past the heater core 19 cut off. A screen portion 36 prevents access to the chamber for fan 14. The broken line position indicates damper position for fresh air with recirculation air cut off.

The control arrangement 22 for the system is best shown in FIG. 1. Temperature lever 38 is pivotally mounted on bracket 39 which is secured to support 40 of single knob control device 41. Lever 38 extends through an elongated hole in a bezel for movement in a horizontal plane. Bowden cable assembly 21 connects lever 38 to arm 20 of water valve 16. Lever 38 is movable from a temp off or water valve off position to water valve open position thereby controlling the amount of heat obtained from the heater core. Thermostat 29 mounted on control arrangement 22 controls the refrigeration system operation. Fan 14 is controlled by a two speed toggle switch 44.

Also included in control arrangement 22 is single knob control device 41. As best shown in FIGS. 3, 4, 5 and 6 control device 41 includes support 40. Support 40 has an upstanding flange portion 45 adapted to be attached to a bezel which in turn is constructed to be attached to the vehicle instrument panel (not shown). Support 40 has a slotted hole 46 through which extends damper control lever 48. Hole 46 controls the movement of lever 48 and preferably restricts same to and fro movement in a horizontal plane. Lever 18 also has a pair of earlike portions 49 and 50 which slidably mount lever 48 on support 40 by means of complementary arcuately formed slotted openings 51 and 52.

As shown best in FIG. 5, ear 49 is slidably mounted on opening 51 in support 40 by means of pin 53 and plastic spacer 55. Pin 53 is also staked to lever 48. The resulting arrangement provides a low friction connection. Ear 50 is similarly mounted on opening 52.

Lever 48 also has flat spring 56 riveted thereto and bearing against ball 58 which extends through a suitable opening in lever 48. Spring 56 is constructed to maintain lever 48 in the central position of slotted hole 46 with ball 58 in a suitable detent 59 in support 40.

Also pivotally mounted on lever 48 is link 60 via pin 61, washer 62, and cotter pin 64. Link 60 is also pivotally connected to crank 65 by means of pin 66, washer 67 and cotter pin 68. Crank 65 is pivotally mounted on a bracket 65a which is integral with support 40 by rivet 69 and washer 70. Extending from the other end of crank 65 is pin 71. Bowden cable assembly 72 having sheath 72a and wire 72b connects crank 65 by means of pin 71 to the crank 32a of heater damper 32. Similarly bowden cable assembly 73 having sheath 73a and wire 73b attached to pin 53 connects ear 49 to fresh air and recirculation damper crank 35a of damper 35. Bowden cable assembly 74 having sheath 74a and wire 74b likewise connects ear 50 to crank 30a of defrost damper 30. Suitable clips 76 and 78 secure the sheaths of cable assemblies 73 and 74 to support 40. Likewise clip 79 also secures cable assembly 72 to support 40.

In operation, see FIGS. 1 and 3, when damper control lever 48 (which may have a knob 48a thereon where same extends through slotted hole 46 for the operator's convenience) is in the central position, the air dampers are positioned to supply heat. Specifically, heater damper 32 is open, defrost damper 30 is closed and combination fresh air and recirculation damper 35 is positioned for the admittance of fresh air to the system. The amount of heat desired is controlled by movement of upper temperature lever 38 from a closed to full open water valve position. The fan speed can be adjusted by means of the fan switch. Of course the thermostat for refrigeration operation is in the off position. If the vehicle operator now moves the damper control lever 48 to the right, ear 50 will move along slotted opening 52 and the attached cable assembly 74 will open defrost damper 30. As lever 48 is moved to the right, link 60 and crank 65 push bowden cable 72 to close heater damper 32. A position of lever 48 between heat and defrost will leave heater damper 32 and defrost damper 30 partially open. During this movement of lever 48, fresh air and recirculation damper 35 is unaffected as lever 48 pivots about the end of slotted opening 51. As lever 48 moves, ear 49 moves down slotted opening 51 and via bowden cable assembly 73 moves fresh air and recirculation damper 35 to the full recirculation or fresh air off position. Lever 48 has also moved heater damper 32 to the closed position by means of link 60, crank 65 and bowden cable assembly 72. A position of lever 48 between heat and maximum AC has both heater damper 32 and damper 35 partially open for fresh air to enter the system. Should it be desired to bring in fresh air without immediately opening heater damper 32, this could be accomplished by, for example, a lost motion connection between lever 48 and link 60. In actual practice, a slightly open heater damper does not substantially limit the cooled air available for high level "spot cooling."

From the foregoing, it is clearly apparent that applicant's unique, single knob control device enables a vehicle operator to properly position the three air dampers of an air conditioning system by to and fro movement of a single lever in preferably a horizontal plane. The temperature control for heat, thermostat for cooling and for air volume are unchanged. The air conditioning system is therefor especially easy to comprehend and operate while being economical to manufacture.

I claim:
1. A control device comprising:
a. a support having a pair of slotted openings;
b. a lever having a pair of ears, one of said pair of ears being slidably mounted on the first slotted opening and the other ear on the second slotted opening of said pair of openings of said support;
c. A link pivotally connected to said lever; and
d. a crank pivotally mounted on said support and pivotally connected to said link, said crank assuming an initial position when said pair of ears are in corresponding ends of said slotted openings and a final position when said one ear has moved to the other end of said first slotted opening or said other ear has moved to the other end of said second slotted opening.

2. The device of claim 1 in which said pair of slotted openings are generally of arcuate configuration.

3. The device of claim 2 further comprising detent means for maintaining said lever and said crank in said initial position.

4. The device of claim 3 in which said support has a slotted hole and said lever extends therethrough for guided linear movement therein.

5. The device of claim 1 further comprising:
a. a first bowden cable assembly connected to said one ear and adapted to be connected to a defrost damper, a second bowden cable assembly connected to said other ear and adapted to be connected to a fresh air and recirculation damper, and a third bowden cable assembly connected to said crank and adapted to be connected to a heater damper.